No. 829,520. PATENTED AUG. 28, 1906.
L. L. & J. W. FOX.
HORSE DETACHER.
APPLICATION FILED FEB. 2, 1906.
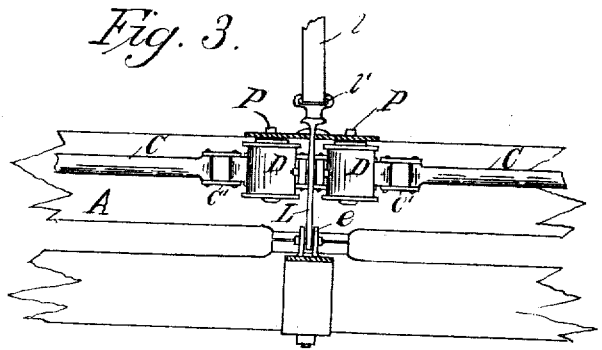
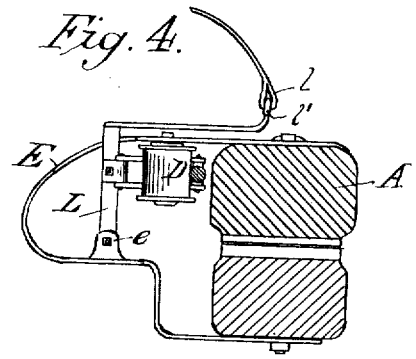
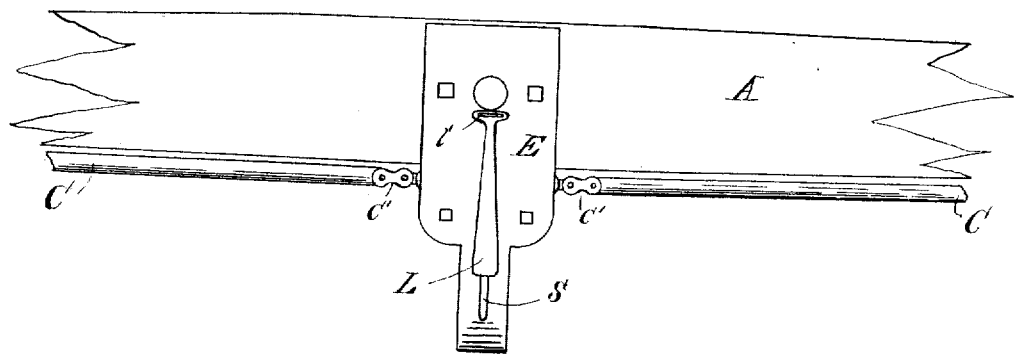
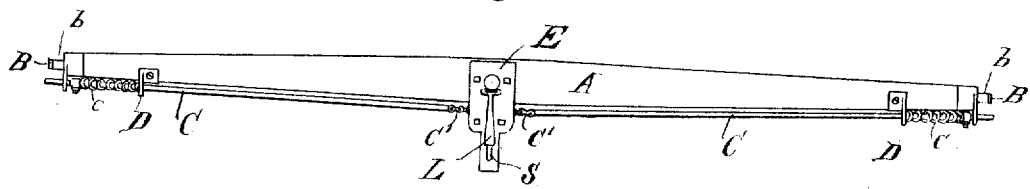
Witnesses.
Mildred B Bailey
Inventors.
Lloyd L. Fox
John W. Fox
By John R. Mason
Attorney

UNITED STATES PATENT OFFICE.

LLOYD L. FOX AND JOHN W. FOX, OF LOWELL, MAINE.

HORSE-DETACHER.

No. 829,520.   Specification of Letters Patent.   Patented Aug. 28, 1906.

Application filed February 2, 1906. Serial No. 299,196.

*To all whom it may concern:*

Be it known that we, LLOYD L. Fox and JOHN W. FOX, citizens of the United States, residing at Lowell, in the county of Penobscot and State of Maine, have invented certain new and useful Improvements in Devices for Clearing Horses from Vehicles; and we do hereby declare the following to be a full, clear, and exact description of the invention, such as will enable others skilled in the art to which it appertains to make and use the same.

Our invention consists of an improvement upon the devices for clearing horses from vehicles for which Letters Patent of the United States No. 694,363, dated March 4, 1902, and No. 717,379, dated December 30, 1902, were granted us and is fully illustrated in the accompanying drawings, in which—

Figure 1 is a plan of the whole device with spring-bolts shot. Fig. 2 is an enlarged plan of same with ends of bolts, whiffletree, and shaft-spreader broken off. Fig. 3 is a rear elevation of same broken off as in Fig. 2 and with bracket broken off to show interior parts. Fig. 4 is a side view of bracket, lever, chain, and pulley with whiffletree-bracket and spreader in cross-section.

Similar letters refer to corresponding parts throughout the figures.

The object of our invention, as indicated by its title, is to enable the driver instantly and at will to free the horse from the vehicle to which he is harnessed and secured by the tugs and holdbacks, and by means of our device that object may be accomplished from the vehicle by a single motion, consisting in pulling back the lever L, preferably by means of the strap $l$ and a few forward steps of the horse.

Parts of our present device are the same as in our former inventions.

It consists of a pair of spring-bolts C C, supported in bearings D on the back of the whiffletree A and working longitudinally therein and actuated and forced in opposite directions toward the ends of the whiffletree by springs $c$, as in said former patents.

To the inner ends of the bolts C C are attached the chains C' C' or other flexible connections, which curve around studs or post P or other bearings fixed in said bracket, upon which are preferably mounted suitable devices for reducing friction, such as the grooved wheels D D, as shown. The inner ends of the connections C' C' after turning about the bearings D D are secured to the lever L, which is pivoted to the bracket E at $e$ and projects upwardly through a slot $s$ in the bracket, and then, preferably bent forward at a considerable angle, terminates in a loop $l'$, to which a strap $l$ may be attached. The bracket E is rigidly secured to the spreader or whiffletree in any convenient manner.

At the ends of the whiffletree we use U-shaped guards B B, having jaws $b\ b$ sufficiently large to receive the butts of the tugs, as in our Letters Patent No. 717,379.

The construction thus far described is for the sole purpose of detaching the tugs from the whiffletree, and the remainder of the device is as in our former patent, No. 717,379—that is, we use no holdback-hook, but in place thereof a stop adjustable at any desired point on the shaft by means of a screw-bolt and nut. Connecting-straps unite the thill-holder, backed against the stop with the holdback.

In operation, the spring-bolts being shot and the lever in forward position, the horse, being harnessed, is backed into the shafts until the thill-holders rest against the stops and the butt-holes of the tugs are slipped over the ends of the spring-bolts, the butts of the tugs resting in the jaws $b$ of the guards B, and being thus prevented from leaving the ends of the bolts. The horse is now fully harnessed in the vehicle, the bent arm of the lever L lying flat upon the top of the bracket E. By a single pull upon the strap $l$ the lever L is moved backward through the slot $s$ and the bolts C C are simultaneously drawn backward out of the butt-holes of the tugs, letting the tugs go free, while the moment the horse steps forward the thill-holders slide from the shafts and the horse is absolutely cleared from the vehicle.

The strap $l$ is of sufficient length to be reached from the driver's seat and may be carried over the dasher of the vehicle or through it or through the bottom of the vehicle.

Having thus described our invention, what we claim, and desire to secure by Letters Patent, is—

1. In a device for clearing horses from vehicles, the combination of a whiffletree having U-shaped guards at each end adapted to receive the butts of the tugs; two spring-bolts working longitudinally in bearings on said whiffletree behind said guards; a bracket rigidly secured to said whiffletree or the shaft-spreader; a lever pivoted to said bracket; and flexible connections uniting the inner ends of said spring-bolts to said lever and turning about studs or other suitable bearings mounted in said bracket.

2. In a device for clearing horses from vehicles, the combination of a whiffletree having U-shaped guards at each end adapted to receive the butts of the tugs; two spring-bolts working longitudinally in bearings on said whiffletree behind said guards; a bracket rigidly secured to said whiffletree or the shaft-spreader; a lever pivoted to said bracket; flexible connections uniting the inner ends of said spring-bolts to said lever and turning about studs or other suitable bearings mounted in said bracket; and a strap attached to the outer end of said lever and of such length as to be reached from the driver's seat.

LLOYD L. FOX.
JOHN W. FOX.

Witnesses:
H. P. WAKEFIELD,
ARABELLA FOX.